United States Patent
Knott, Sr.

(10) Patent No.: US 6,386,146 B1
(45) Date of Patent: *May 14, 2002

(54) AQUACULTURE METHOD AND APPARATUS

(76) Inventor: James M. Knott, Sr., 456 Hill St., Whitinsville, MA (US) 01588

( * ) Notice: Subject to any disclaimer, the term of this patent is extended or adjusted under 35 U.S.C. 154(b) by 0 days.

This patent is subject to a terminal disclaimer.

(21) Appl. No.: 09/517,098

(22) Filed: Mar. 2, 2000

(51) Int. Cl.[7] .......................... A01K 71/00; A01K 63/00
(52) U.S. Cl. .......................... 119/223; 119/452; 43/102
(58) Field of Search ................................. 119/223, 215, 119/217, 221, 222, 452, 459, 200; 43/55, 56, 102

(56) References Cited

U.S. PATENT DOCUMENTS

| | | | | |
|---|---|---|---|---|
| 2,603,028 A | * | 7/1952 | Roberts ........................ | 119/223 |
| 2,854,782 A | * | 10/1958 | Daugherty .................... | 43/55 |
| 3,374,770 A | * | 3/1968 | Freudenberger ............. | 119/223 |
| 4,079,698 A | * | 3/1978 | Neff et al. ................... | 119/223 |
| 4,084,543 A | * | 4/1978 | Pequegnat ................... | 119/223 |
| 4,244,323 A | * | 1/1981 | Morimura .................... | 119/223 |
| 4,257,350 A | * | 3/1981 | Streichenberger ........... | 119/223 |
| 4,890,413 A | * | 1/1990 | Nelson et al. ................ | 43/55 |
| 5,009,189 A | * | 4/1991 | Neff ............................. | 119/223 |
| 5,549,076 A | * | 8/1996 | Kaarstad ...................... | 119/223 |
| 5,617,813 A | * | 4/1997 | Loverich et al. ............. | 119/223 |
| 5,967,086 A | | 10/1999 | Knott, Sr. | |

* cited by examiner

*Primary Examiner*—Charles T. Jordan
*Assistant Examiner*—Judith A. Nelson
(74) *Attorney, Agent, or Firm*—John E. Toupal; Harold G. Jarcho

(57) ABSTRACT

An aquaculture cage including a buoyant upper support for disposition at the surface of a water body; a side wall having an upper edge secured to said upper support so as to project below the surface of the water body, the side wall being formed with a plurality of vertically contractible, non-buoyant panels having vertically adjacent edges joined to form an enclosure and each of the joined vertical edges defining a plurality of vertically spaced apart loops; and an elongated connector element extending through the loops of the adjacent edges so as to secure together the panels. Also included is a bottom wall joined to the side wall to close the bottom of the enclosure.

20 Claims, 3 Drawing Sheets

AQUACULTURE METHOD AND APPARATUS

BACKGROUND OF THE INVENTION

This invention relates generally to an aquaculture method and apparatus and, more particularly, to an aquaculture method and apparatus employing a cage formed out of a vertically contractible, non-buoyant mesh material.

Aquaculture is a rapidly expanding industry providing increasing quantities of various fish products. In comparison to conventional commercial fishing techniques, aquaculture offers the advantages of a predictable harvest and reduced labor and equipment cost. However, present systems are plagued with a variety of serious problems.

Typical aquaculture systems utilize weighted, fiber mesh nets suspended in a suitable water body by floatation rings. After a given growth period, the cage is lifted to the surface of the water body for harvest of a retained fish crop. Serious losses are caused in such aquaculture systems by large aquatic predators such as sharks, tuna and seals that easily penetrate the fiber mesh nets and feed upon the resident fish. Further losses occur when remaining fish escape through the openings created in the net by the predators.

To alleviate the predator problem, many aquaculture systems provide an auxiliary net that surrounds and is spaced from the fish retaining primary net. However, such protective netting also is subject to penetration by predators. Other disadvantages of currently employed fiber mesh nets are a requirement for extensive anchoring and a tendency for the flexible nets to be displaced by tidal flows and thereby undesirably crowd resident fish. An improved aquaculture system is disclosed in U.S. Pat. No. 5,967,086. That system includes a cage having contractible mesh side walls formed with relatively rigid, linked spiral wire resistant to planar deformation. Efficient farming operation, however, requires cages with side walls of a substantial size which creates a problem for transportation between a factory and a site of use.

The object of this invention, therefore, is to provide an improved aquaculture system that reduces problems inherently present in existing systems.

SUMMARY OF THE INVENTION

The invention is an aquaculture cage including a buoyant upper support for disposition at the surface of a water body; a side wall having an upper edge secured to the upper support so as to project below the surface of the water body, the side wall being formed with a plurality of vertically contractible, non-buoyant panels having vertically adjacent edges joined to form an enclosure and each of the joined vertical edges defining a plurality of vertically spaced apart loops; and an elongated connector element extending through the loops of the adjacent edges so as to secure together the panels. Also included is a bottom wall joined to the side wall to close the bottom of the enclosure. The use of panels permits convenient assembly of the cage at a site of desired use.

According to certain features of the invention, each panel is formed with metallic, spirally linked wires defining a mesh having substantial planar rigidity so as to resist horizontally directed deformation and end portions of the wires are formed into the loops which are aligned vertically. Efficient use of the cage is enhanced by these features.

According to another feature of the invention, the connector is substantially flaccid so as to be vertically contractible. The flaccid connector can collapse during contraction of the panels.

According to an additional feature of the invention, the mesh has interstices having a maximum diagonal of length D and loops have a minimum diagonal of length d greater than D. This feature restricts passage of the loops through the interstices thereby preventing the mesh from unraveling.

According to yet another feature, the invention includes a powered lift mechanism for applying upwardly directed force to the bottom so as to produce upward movement thereof and contraction of the panels. The lift mechanism is used during harvest of fish grown in the cage.

According to a further feature of the invention, the bottom includes a wire mesh central portion, and a rigid annular support disposed between a perimeter of the mesh portion and bottom edges of the panels. The central portion allows water passage and the rigid support facilitates contraction of the panels by the lift mechanism.

According to still another feature of the invention, a wire end portion has an inner portion formed into a loop and an outer portion wound around an inner section of the inner portion. These features provide efficient, stable loops for receiving the connector.

The invention also encompasses an aquaculture method including the steps of forming a plurality of contractible non-buoyant mesh panels having side, bottom and top edges; transporting the panels to a location having a water body; joining adjacent side edges of the panels to form an enclosure; and attaching a closure to the bottom edges to close the bottom of the enclosure. Additional steps include positioning the enclosure in the water body; supporting the enclosure from the surface of the water body with a buoyant support; growing a fish crop in the enclosure; applying a force to move the closure upwardly to contract the enclosure; and harvesting the fish crop at the surface of the water body.

According to one feature of the method, the forming step includes forming the panels with metallic, spirally linked wires having substantial rigidity so as to resist deformation by water currents and creatures, and forming loops with end portions of the wires at the side edges of the panels; and the joining step includes inserting an elongated connector element through the loops. These features facilitate assembly of the enclosure.

According to another feature of the method, the forming step includes forming an inner portion of each end portion into a loop, and winding an outer portion of each end portion around an inner section of the inner portion. These features provide efficient, stable loops.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
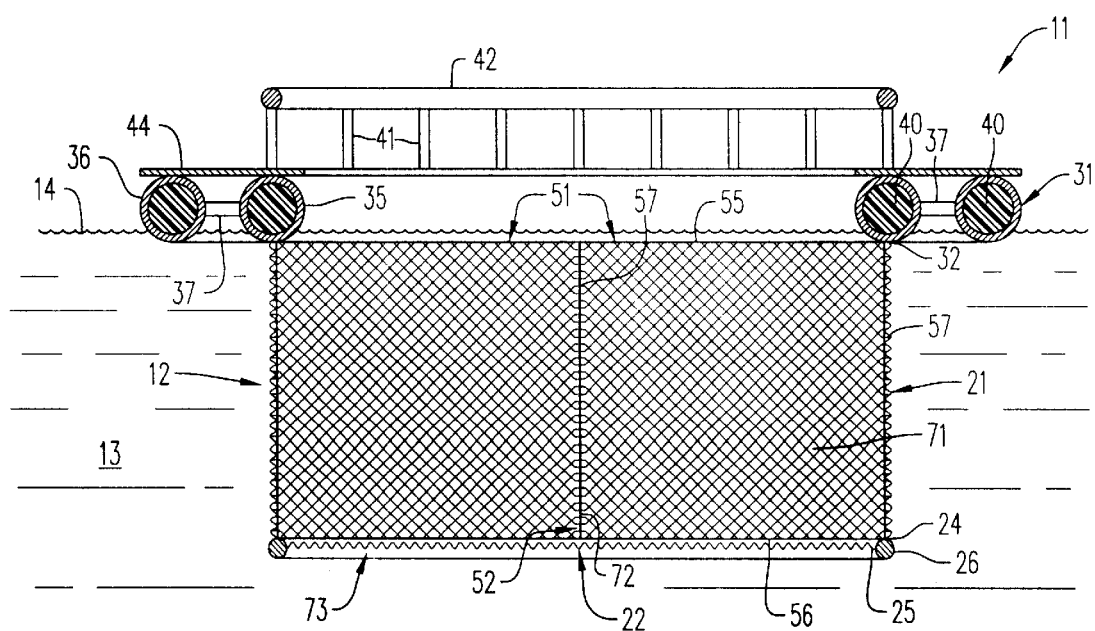
FIG. 1 is an elevational cross sectional view of an aquaculture system according to the invention.
Figure 2:
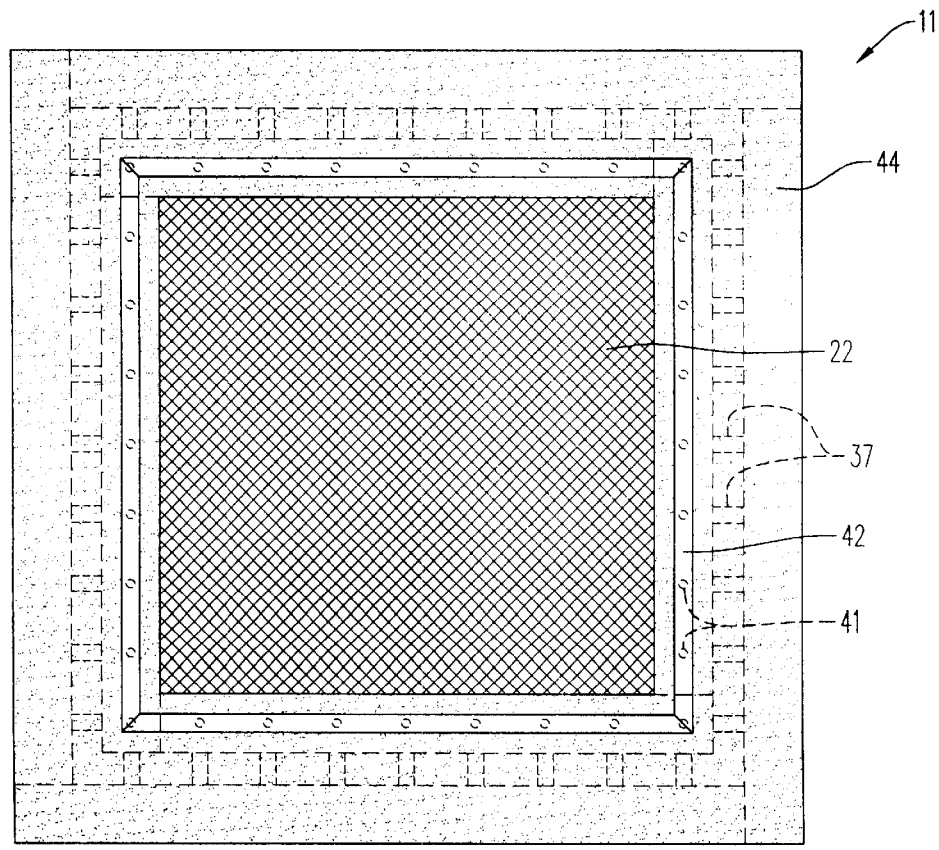
FIG. 2 is a top view of the system shown in FIG. 1.

An aquaculture system 11 includes a cage 12 submerged in a water body 13 having a surface 14. The cage 12 has a rectangularly annular side wall portion 21 and a rectangular bottom wall portion 22. Disposed between a bottom edge 24 of the side wall portion 21 and an outer edge 25 of the bottom wall portion 22 is a lower support formed by a rigid rectangularly annular tube 26. An upper support assembly 31 is secured to an upper edge 32 of the side wall portion 21. Also included in the system 11 is a lift mechanism 30 (FIG. 4) for producing upward vertical collapse of the cage 12 as described hereinafter.

Figure 3:
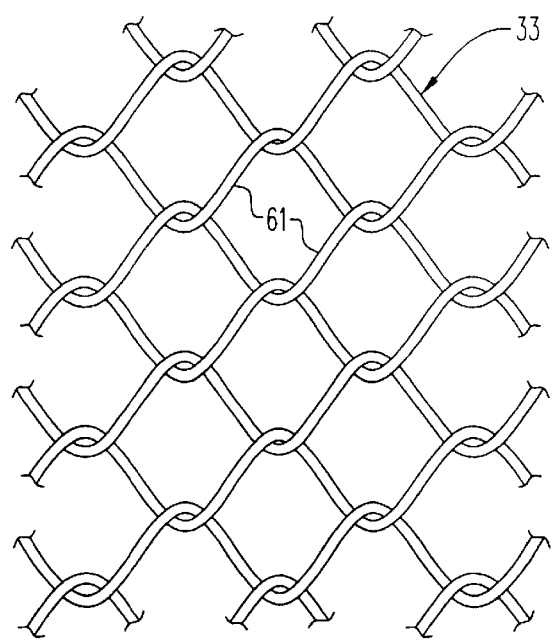
FIG. 3 is a detailed partial view showing construction of linked spiral mesh material used in the system shown in FIGS. 1 and 2.

The side wall portion 21 of the cage 12 is formed of a metallic, corrosion resistant wire mesh having substantial planar rigidity so as to resist horizontal deformation in response to water creature impact and water currents. Preferably, the wire forming the cage 12 has a gauge less than twenty (20) and is selected from a group consisting of stainless steel, aluminum, plastic coated metal, copper, cupro-nickel, monel, galvanized steel, galvanized (5% aluminum 94% zinc+mishmetal) steel, and aluminized steel. At least the side wall portion 21 of the cage 12 is formed with a non-buoyant, contractible mesh material. To provide the desired contractibility, the side wall portion 21 of the cage 12 preferably is constructed of a linked spiral mesh 33 (FIG. 3) typically used in conventional chain link fence.

The upper support assembly 31 includes a sealed, buoyant inner tube 35 attached to the upper edge 32 of the side wall portion 21 and a sealed, buoyant outer tube 36 attached to the inner tube 35 by a plurality of struts 37. To ensure buoyancy, the inner and outer tubes 35, 36 preferably are filled with a suitable buoyant foam 40. Supported on a platform 44 above the inner tube 35 are circumferentially spaced apart ballasters 41 and a railing 42. The railing 42 provides a support for a cover assembly (not shown) which isolates the cage 12 from flying predators. Forming the lift mechanism 30 is a conventional powered hoist device 45 operatively coupled to the lower support tube 26 by cables 46.

Figure 5:
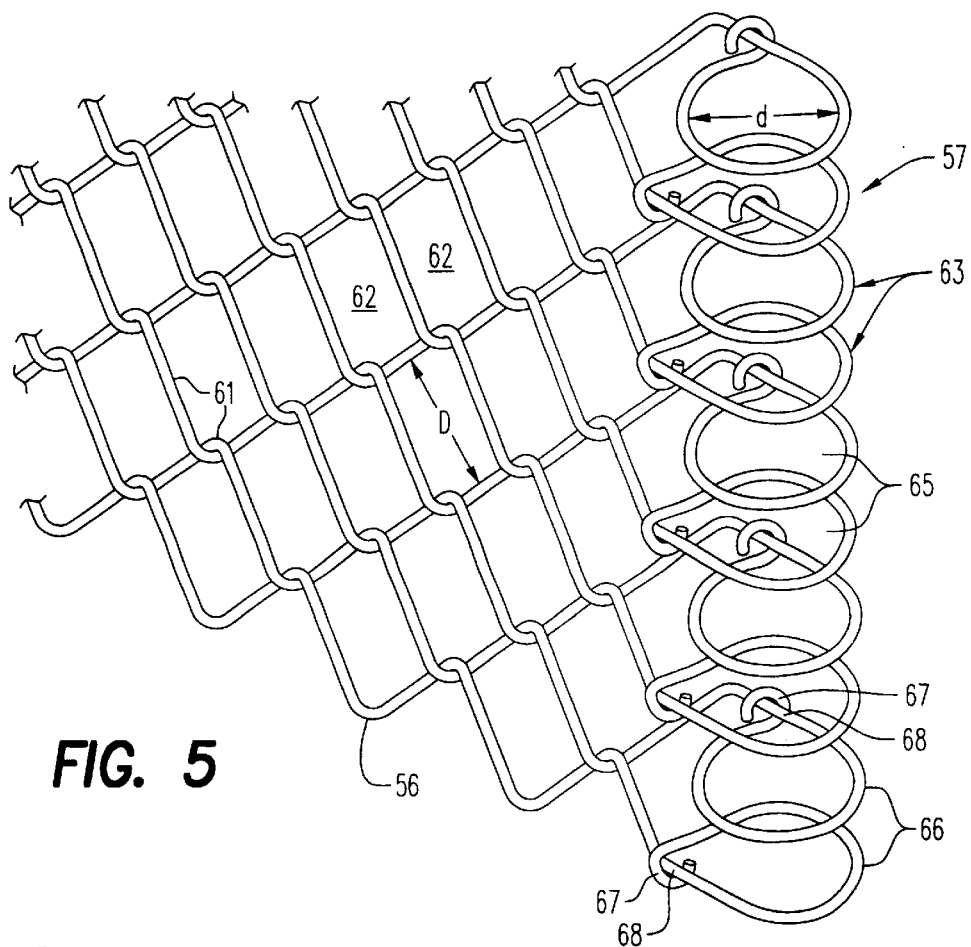
FIG. 5 is a perspective view illustrating an edge portion of wire mesh used for side walls of the system.

The side wall portion 21 is formed with rectangular panels 51 having vertically adjacent edges attached at joints 52. Each panel 51 has a top edge 55, a bottom edge 56 and side edges 57. As shown in FIG. 5, spirally wound wires 61 form the mesh 33 having interstices 62. End portions 63 of the wires 61 along the side edges 57 define loops 65. During formation of the panels 51, an inner portion 66 of each wire end portion 63 is bent into one of the loops 56 and an outer portion 67 of the end portion 63 is wound around an inner section 68 of the inner portion 66. Preferably, each of the interstices 62 has a maximum diagonal of length D and each loop 65 has a minimum diagonal d greater than D. Those relative dimensions prevent passage of the loops 65 through the interstices 62 and thereby ensure against unraveling of the panels 51 prior to creation of the joints 52.

Figure 6:
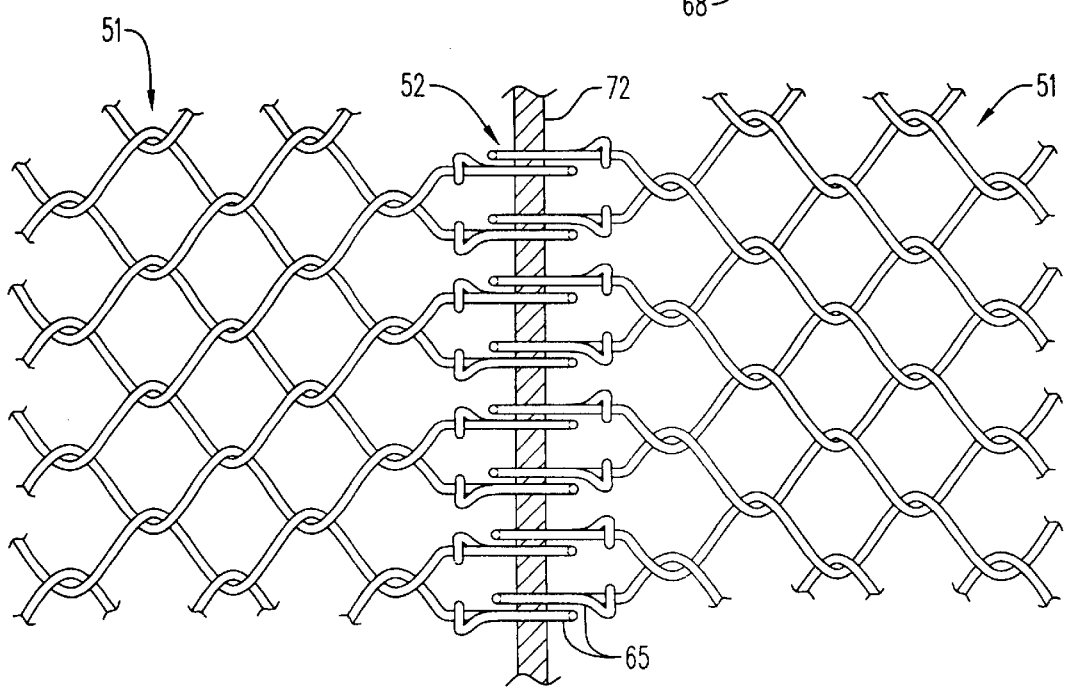
FIG. 6 is a front view illustrating a partial section of a joint between adjacent side wall portions of the system.

After formation in a factory, the panels 51 are transported to a site of intended use. There, adjacent side edges 57 of a selected number of the panels 51 are connected to create an enclosure 71 of a desired configuration as, for example, the rectangular configuration shown. Creation of the joints 52 is accomplished by inserting an elongated connector 72 through the aligned loops 65 (FIG. 6). Preferably, the connector 72 is a flaccid member such as a rope so as to collapse longitudinally as the panels 51 contract in a manner described hereinafter. The bottom of the enclosure is closed by securing to the bottom edges 56 with suitable means (not shown) a closure 73 composed of the bottom wall 21 and attached lower support tube 26. Once disposed in the water body 13, the cage 12 is supported below the surface 14 thereof by the upper support 31 secured to the top edges 55 of the panels 51.

Figure 4:
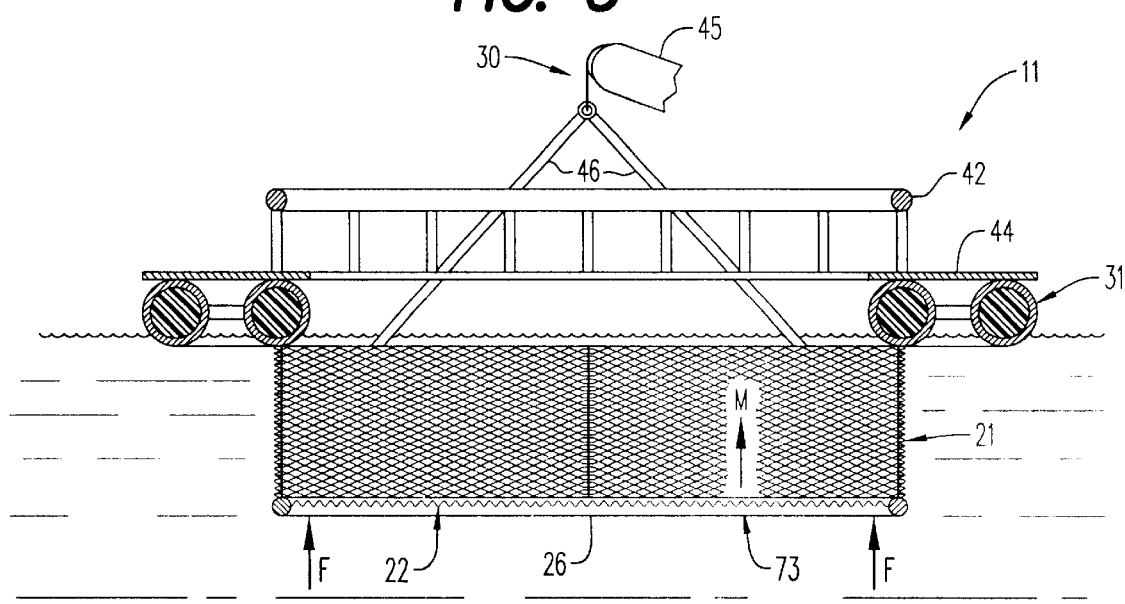
FIG. 4 is an elevational view illustrating fish harvesting operations of the system.

According to a preferred method of using the aquaculture system 11, a suitable quantity of young fish such as salmon is deposited into the cage 12. Subsequently, after a time period required for the fish to reach marketable size, they are harvested in the following manner. The lift mechanism 30 which can be, for example, the conventional hoist 45 operatively coupled to the lower support tube 26 by cables 46 applies an upwardly directed force F on the cage 12 to produce upward movement M of the tube 26 and resultant contraction of the side wall portions 21 as shown in FIG. 4. During this contraction of the wall portions 12, the bottom wall portion 22 of the cage 12 gradually moves the fish content of the cage 12 toward the water surface 14 where the fish are harvested by conventional harvesting equipment (not shown).

Obviously, many modifications and variations of the present invention are possible in light of the above teachings. For example, the rope 72 could be replaced by a rigid rod in which case the loops 65 would slide along the connector during contraction of the enclosure 71. It is to be understood, therefore, that the invention can be practiced otherwise than as specifically described.

What is claimed is:

1. An aquaculture cage comprising:
   a buoyant upper support means for disposition at the surface of a water body of an aquaculture farm;
   a side wall having an upper edge secured to said upper support means so as to project below the surface of said water body; said side wall being formed with a plurality of vertically contractible, non-buoyant panels having vertically adjacent edges joined to form an enclosure, each of said joined vertical edges defining a plurality of vertically spaced apart loops;
   an elongated connector element extending through said loops of said adjacent edges so as to secure together said panels; and
   bottom wall means joined to said side wall to close the bottom of said enclosure.

2. A cage according to claim 1 wherein each of said panels is formed with metallic, spirally linked wires defining a mesh having substantial planar rigidity so as to resist horizontally directed deformation.

3. A cage according to claim 2 wherein end portions of said wires are formed into said loops.

4. A cage according to claim 3 wherein said loops of said adjacent edges are aligned vertically.

5. A cage according to claim 3 wherein said connector is substantially flaccid so as to be vertically contractible.

6. A cage according to claim 5 wherein said loops of said adjacent edges are aligned vertically.

7. A cage according to claim 2 wherein said mesh has interstices having a maximum diagonal of length D and said loops have a minimum diagonal of length d greater than D.

8. A cage according to claim 1 wherein said bottom means comprises a wire mesh central portion, and a rigid annular support disposed between a perimeter of said mesh portion and bottom edges of said panels.

9. A cage according to claim 1 including powered lift means for applying upwardly directed force to said bottom means so as to produce upward movement thereof and contraction of said panels.

10. A cage according to claim 9 wherein each of said panels is formed with metallic, spirally linked wires defining a mesh having substantial planar rigidity so as to resist horizontally directed deformation.

11. A cage according to claim 10 wherein end portions of said wires are formed into said loops.

12. A cage according to claim 10 wherein said loops of said adjacent edges are aligned vertically.

13. A cage according to claim 11 wherein said connector is substantially flaccid so as to be vertically contractible.

14. A cage according to claim 13 wherein said loops of said adjacent edges are aligned vertically.

15. A cage according to claim 9 wherein said mesh has interstices having a maximum diagonal of length D and said loops have a minimum diagonal of length d greater than D.

16. A cage according to claim 3 wherein each said end portion comprises an inner portion formed into a loop and an outer portion wound around an inner section of said inner portion.

17. An aquaculture method comprising the steps of:
   forming a plurality of contractible non-buoyant mesh panels having side, bottom and top edges;
   transporting said panels to a location having a water body;
   joining adjacent said side edges of said panels to form an enclosure;
   attaching a closure means to said bottom edges to close the bottom of said enclosure;
   securing said top edges to a buoyant means;
   positioning said enclosure in the water body;
   supporting said enclosure from the surface of the water body with a buoyant support means;
   growing a fish crop in said enclosure;
   applying a force to move said closure means upwardly to contract said enclosure; and
   harvesting the fish crop at the surface of said water body.

18. A method according to claim 17 wherein said forming step comprises forming said panels with metallic, spirally linked wires having substantial rigidity so as to resist deformation by water currents and creatures.

19. A method according to claim 18 wherein said forming step comprises the steps of forming loops with end portions of said wires at the side edges of said panels, and said joining step comprises inserting an elongated connector element through said loops.

20. A method according to claim 19 wherein said loop forming steps comprises the step of forming an inner portion of each end portion into a said loop, and winding an outer portion of each end portion around an inner section of said inner portion.

* * * * *